United States Patent
Wu et al.

(10) Patent No.: US 10,722,843 B2
(45) Date of Patent: Jul. 28, 2020

(54) METHOD AND SYSTEM FOR CATALYTIC OXIDATION OF A LEAN $H_2S$ STREAM

(71) Applicant: HALDOR TOPSØE A/S, Kgs. Lyngby (DK)

(72) Inventors: Hans Qiongxiao Wu, Beijing (CN); Tommy Bian Xiang, Beijing (CN); Niklas Bengt Jakobsson, Kågeröd (SE); Rasmus Trane-Restrup, Roskilde (DK); Souheil Saadi, Rødovre (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 16/477,934

(22) PCT Filed: Jan. 11, 2018

(86) PCT No.: PCT/EP2018/050623
§ 371 (c)(1),
(2) Date: Jul. 15, 2019

(87) PCT Pub. No.: WO2018/130598
PCT Pub. Date: Jul. 19, 2018

(65) Prior Publication Data
US 2019/0366266 A1    Dec. 5, 2019

(30) Foreign Application Priority Data
Jan. 16, 2017  (CN) .......................... 2017 1 0033153

(51) Int. Cl.
*B01D 53/86* (2006.01)
*B01J 35/04* (2006.01)
*C01B 17/50* (2006.01)

(52) U.S. Cl.
CPC .......... *B01D 53/8612* (2013.01); *B01J 35/04* (2013.01); *C01B 17/508* (2013.01)

(58) Field of Classification Search
CPC ....... C01B 17/48; C01B 17/50; C01B 17/501; C01B 17/508; C01B 17/52; B01D 53/52;
(Continued)

(56) References Cited

U.S. PATENT DOCUMENTS 2,301,650 A * 11/1942 Titlestad ................. C01B 17/50
423/539
4,169,136 A    9/1979 Hass et al.
(Continued)

FOREIGN PATENT DOCUMENTS

EP    2878367 A1    6/2015
RU    2276097 C2    5/2006
(Continued)

OTHER PUBLICATIONS

International Search Report (PCT/ISA/210) dated Mar. 16, 2018, by the European Patent Office as the International Searching Authority for International Application No. PCT/EP2018/050623.
(Continued)

*Primary Examiner* — Timothy C Vanoy
(74) *Attorney, Agent, or Firm* — Buchanan Ingersoll & Rooney P.C.

(57) ABSTRACT

The present invention relates to a method and a system for catalytic oxidation of a lean $H_2S$ stream. More specifically, the invention concerns a novel way of removing sulfur dioxide ($SO_2$) formed by catalytic oxidation of hydrogen sulfide ($H_2S$) with the purpose of removing $H_2S$ from a gas. This catalytic oxidation of $H_2S$ yields sulfur dioxide ($SO_2$) through the use of known catalysts, so-called SMC catalysts.

12 Claims, 1 Drawing Sheet

(58) Field of Classification Search
CPC ................ B01D 53/74; B01D 53/8612; B01D 2257/304; B01J 8/00; B01J 19/00; B01J 2208/00; B01J 2219/00
See application file for complete search history.

(56) References Cited

U.S. PATENT DOCUMENTS

| | | |
|---|---|---|
| 4,314,983 A | 2/1982 | Hass et al. |
| 5,229,091 A | 7/1993 | Buchanan et al. |
| 5,728,358 A * | 3/1998 | Avidan .................. B01D 53/04 423/244.01 |
| 6,610,264 B1 | 8/2003 | Buchanan et al. |
| 2002/0134706 A1 | 9/2002 | Keller et al. |
| 2014/0020399 A1 | 1/2014 | Hueller |

FOREIGN PATENT DOCUMENTS

| | | |
|---|---|---|
| RU | 2533140 C2 | 11/2014 |
| WO | 2015176180 A1 | 11/2015 |
| WO | 2016041822 A1 | 3/2016 |
| WO | 2017140662 A1 | 8/2017 |

OTHER PUBLICATIONS

Written Opinion (PCT/ISA/237) dated Mar. 16, 2018, by the European Patent Office as the International Searching Authority for International Application No. PCT/EP2018/050623.
Search Report dated Sep. 6, 2016, by the Danish Patent and Trademark Office in corresponding Application No. PA 2016 00093.

\* cited by examiner

METHOD AND SYSTEM FOR CATALYTIC OXIDATION OF A LEAN H₂S STREAM

The present invention relates to a method and a system for catalytic oxidation of a lean $H_2S$ stream. More specifically, the invention concerns a novel way of removing sulfur dioxide ($SO_2$) formed by catalytic oxidation of hydrogen sulfide ($H_2S$) with the purpose of removing $H_2S$ from a gas. This catalytic oxidation of $H_2S$ yields sulfur dioxide ($SO_2$) through the use of known catalysts, so-called SMC catalysts, which will be described in the following.

The process of removing $H_2S$ from a gas can be summarized schematically as follows: An optionally pre-heated $H_2S$-containing gas is mixed with air or oxygen, and then the mixture is fed to a catalyst-containing reactor via a heat exchanger. In this reactor, $H_2S$ is oxidized to sulfur dioxide ($SO_2$) according to the reaction

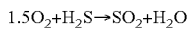

$$1.5O_2 + H_2S \rightarrow SO_2 + H_2O$$

The idea underlying the present invention is to add syngas to a lean $H_2S$ stream, which is to be treated by catalytic oxidation as described above, thereby obtaining $SO_2$. The treatment is carried out in an SMC (Sulfur Monolith Catalyst) unit.

Thus, the present invention relates to a method for the oxidation of hydrogen sulfide, carbonyl sulfide or carbon disulfide to sulfur dioxide, said method comprising the steps of:
providing a feed gas lean in $H_2S$,
adding air or $O_2$ to the feed gas,
heating the feed gas to the desired inlet temperature,
feeding the gas mixture to an oxidation reactor, which contains a catalyst, and
recovering a cleaned gas,
wherein syngas is added to the gas mixture prior to feeding the gas mixture to the oxidation reactor.

The catalyst is preferably a sulfur monolith catalyst.

Preferably the gas mixture is fed to the oxidation reactor via a heat exchanger.

Furthermore, the invention relates to a system, in which the method for the oxidation of hydrogen sulfide to sulfur dioxide is carried out. This system comprises a gas blower, a heat exchanger and an oxidation reactor, which contains a catalyst, preferably a sulfur monolith catalyst.

The SMC technology is aimed at sulfur abatement in gases with low fuel value. The conventional way of treating such gases consists in using support fuel in combination with thermal oxidation. Another way is to blend the gas of low fuel value with the feed gas to a Claus plant or a sulfuric acid plant which, however, often will lead to an increased demand for support fuel and a substantial increase of the size of such a unit.

The core of the SMC technology is the SMC catalyst, which selectively oxidizes $H_2S$ and other sulfur compounds, such as carbonyl sulfide (COS) and carbon disulfide ($CS_2$), to $SO_2$ and oxidizes higher hydrocarbons, hydrogen and CO to $CO_2$ and water. The SMC catalyst can operate at temperatures from 200° C., and the unique design of the catalyst enables operation with a very low pressure drop, a low surplus of oxygen, low formation of $SO_3$ and without formation of $NO_x$. If required, the $SO_2$ formed can be removed in a caustic scrubber.

In the method of the present invention, the oxidation of $H_2S$ proceeds at an inlet temperature to the catalyst between 200 and 450° C. Preferably, the inlet temperature to the catalyst is between 250 and 400° C., most preferably between 250 and 300° C.

Figure 1:
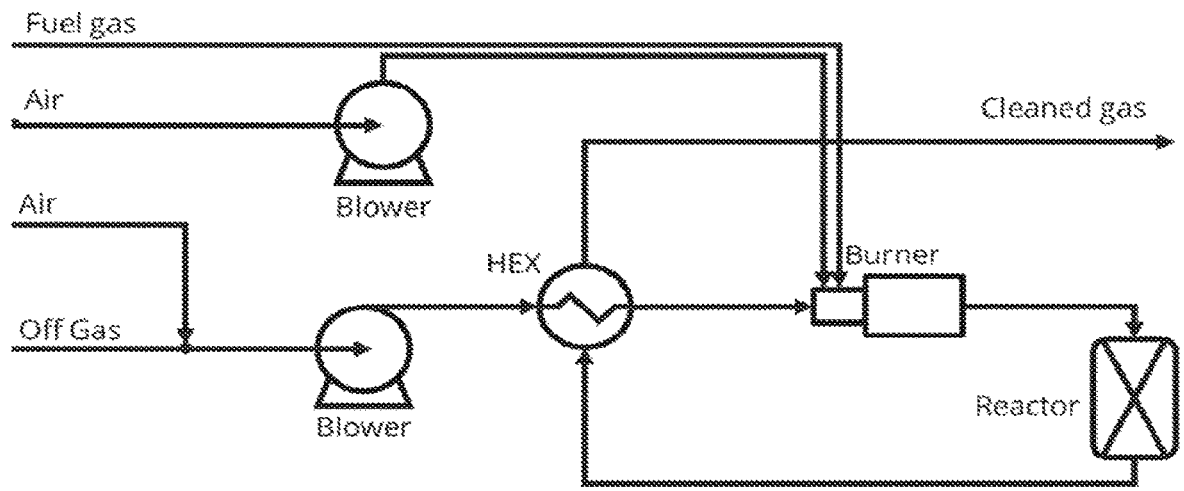
FIG. 1 illustrates a typical design as used in the conventional way of gas treatment. In addition to the catalytic oxidation reactor, the design includes two gas blowers, a heat exchanger and a burner to raise the temperature of the feed gas before entering the catalytic reactor.

By adding syngas to a lean $H_2S$ stream, which is to be treated by catalytic oxidation, the heating value of the gas will increase. Further, the amount of equipment needed is minimized, which also holds true for the size of the individual pieces of equipment, especially the size of the feed/effluent heat exchanger(s) constituting the most expensive part of the SMC unit. In addition, the OPEX (the operating expense) decreases because expensive feed gases or natural gas can be replaced by cheaper fuel gases, which also are oxidized at a lower air surplus. This decreases the air requirement and the duty of the blowers.

Basically the SMC technology is the catalytic oxidation of $H_2S$ at temperatures between 200° C. and 450° C. The oxidation reactions can increase the temperature across the reactor by 10 to 150° C. depending on the gas composition. The feed gas is often delivered at ambient temperatures, and heating of the feed gas can be accomplished by a feed/effluent heat exchanger. However, if the gas is lean (low temperature increase), such heat exchangers will become uneconomically large due to a low driving force for the heat exchange process. The heat exchanger itself will often constitute a large fraction of the overall CAPEX (capital expenditure) of an SMC unit. Therefore, a fired heater using fuel gas or natural gas is sometimes used to raise the temperature. This adds to both the CAPEX and the OPEX, since a burner as well as a combustion air blower is needed along with continuous consumption of fuel gas or natural gas. Furthermore, $NO_x$ (i.e. NO and/or $NO_2$) may be formed in the burner. As mentioned above, use of a burner is not needed in the process of the invention.

The method according to the invention, which is especially relevant for coal gasification units, includes adding a small fraction of syngas (containing $H_2$, CO and $CO_2$) to increase the temperature raise across the reactor, since both CO and $H_2$ can be oxidized over the SMC catalyst. This approach has the benefits of decreasing the size of the heat exchangers without adding more equipment to the plant. In addition, the oxygen consumption as well as the air blower power consumption will be lower since the SMC unit operates at a lower air surplus compared with a burner, and formation of $NO_x$ is avoided. Syngas is most often cheaper than fuel gas or natural gas, whereby the OPEX is reduced.

Methods as well as catalysts for oxidative conversion of $H_2S$ to $SO_2$ are well-known in the art. Thus, EP 2 878 367 A1, belonging to the applicant, relates to materials consisting of $V_2O_3$ on a porous support, that are catalytically active in the oxidation of sulfur compounds, such as oxidation of $H_2S$ to $SO_2$, at temperatures between 180 and 450° C.

U.S. Pat. No. 4,314,983 describes a process for converting $H_2S$ to $SO_2$ with a solid catalyst comprising at least 5 wt % of bismuth. Essentially no $SO_3$ is formed in the catalytic process. In this patent it is stated that the bismuth content of at least 5 wt % is necessary to stabilize the catalyst.

US 2014/0020399 describes a method for generating current from an exhaust gas containing $H_2S$. The exhaust gas is combusted, possibly under addition of supplementary fuel, and the heat released is used for current generation. The $SO_2$ and the $SO_3$ in the gas after combustion of the $H_2S$ are delivered for desulfurization.

In RU 2.276.097 C, a process for selective catalytic oxidation of $H_2S$ is disclosed. The catalyst is iron oxide supported by a porous oxide. A similar process, in which a different catalyst is used, is disclosed in RU 2.533.140 C.

In none of these documents the possibility of adding syngas to the feed gas prior to entering the catalyst-containing oxidation reactor is mentioned.

Usual routes to abatement of sulfur are solutions of absorbent type for low concentrations of $H_2S$, whereas higher concentrations of $H_2S$ can be used for production of chemicals, e.g. elemental sulfur or sulfuric acid.

The present invention utilizes catalytic oxidation of $H_2S$ to $SO_2$ at temperatures between 200 and 450° C., preferably between 250 and 400° C. and most preferably between 250 and 300° C. In comparison with combustion, which takes place at temperatures above 800° C., catalytic oxidation therefore offers the possibility of reducing the use of supplemental fuel in order to increase the temperature, thereby lowering the operating costs. Furthermore, the catalytic oxidation of $H_2S$ can be performed at an oxygen concentration of below 2 vol %, measured at the outlet of the $H_2S$ oxidation reactor, whereas combustion of $H_2S$ typically requires an oxygen concentration of more than 3 vol % at the outlet of the furnace. This means that the process gas flow is reduced compared to combustion, thereby reducing both investment and operating costs.

In the process of removing $H_2S$ from a gas, an SMC catalyst, i.e. a monolithic type catalyst, is used in the reactor converting $H_2S$ to $SO_2$. This catalyst is a corrugated fibrous monolith substrate coated with a supporting oxide. It is preferably coated with $TiO_2$ and subsequently impregnated with $V_2O_3$ and/or $WO_3$. The channel diameter of the corrugated monolith is between 1 and 8 mm, and the wall thickness of the corrugated monolith is between 0.1 and 0.8 mm.

The monolith type catalyst is preferably manufactured from a support material comprising one or more oxides of metals selected from aluminium, silicon and titanium, and the active catalytic components preferably comprise one or more oxides of a metal selected from vanadium, chromium, tungsten, molybdenum, cerium, niobium, manganese and copper. Said materials are effective in the catalytic oxidation of hydrogen sulfide at low temperatures.

Monoliths are increasingly being used, developed, and evaluated as catalyst supports in many new reactor applications such as chemical and refining processes, catalytic oxidation, ozone abatement etc. When the active catalyst has a monolithic structure, it displays a low pressure drop as already mentioned.

The invention is illustrated further in the examples which follow.

EXAMPLES

The addition of syngas is interesting in situations where the temperature increase over an SMC catalyst is less than 40° C., which corresponds to a concentration of $H_2S$ below 2000-3000 ppm $H_2S$ (dependent on the remaining constituents and whether other combustible compounds, like CO or $H_2$, are present). The lower heating value (LHV) should be less than roughly 22 kCal/h.

Two situations are investigated: One according to the prior art and one according to the invention, illustrated in FIG. 1 and FIG. 2, respectively.

Example 1

This example illustrates the prior art as shown in FIG. 1. In this prior art design, a burner is utilized to increase the temperature approach in the feed/effluent heat exchanger (HEX). The basis of the examples is the feed gas, which has the properties and the composition given in Table 1 below:

TABLE 1

| Properties and composition of feed gas | |
| --- | --- |
| properties | |
| Temperature [° C.] | 10 |
| Pressure [mbar g] | 150 |
| Flow [Nm³/h] | 100,000 |
| composition | |
| $N_2$ [mole %] | 14 |
| $CO_2$ [mole %] | 84.7 |
| $H_2O$ [mole %] | 1 |
| $H_2S$ [ppm] | 3000 |

In this example, the consumption of fuel gas amounts to 541 Nm³/h.

Example 2

Figure 2:
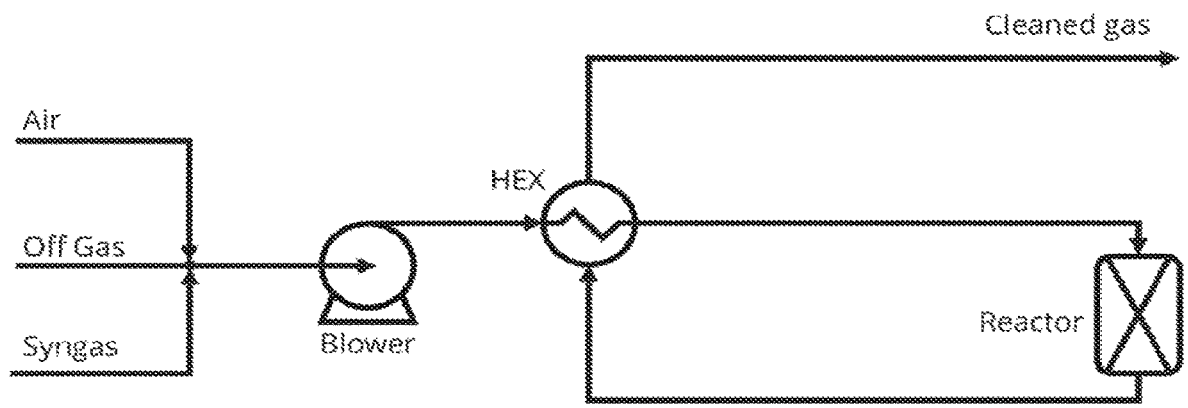
FIG. 2 illustrates the design of an SMC unit to be used when carrying out the process of the invention. This design comprises only one gas blower, and use of a gas burner to raise the temperature of the feed gas is not needed.

This example illustrates the present invention as shown in FIG. 2. In this inventive design, it is not required to use a burner to increase the temperature approach in the heat exchanger (HEX).

Syngas is added to raise the temperature increase in the SMC reactor, hereby also improving the temperature approach in the feed/effluent heat exchanger.

The consumption of fuel gas and syngas, as well as an estimated OPEX based on a fuel gas price of 3 RMB/Nm³ and a syngas price of 0.5 RMB/Nm³ can be seen in Table 2 below. More syngas will be required since the heating value is lower. However, the syngas cost will be much lower compared to Example 1.

TABLE 2

| Comparison of examples 1 and 2 | | | |
| --- | --- | --- | --- |
| | Gas consumption [Nm³/h] | Price [mRMB/yr] | Relative [%] |
| Example 1 | 541 | 13 | 100 |
| Example 2 | 1380 | 5.5 | 44 |

Regarding the equipment, a blower is saved as well as a burner in the design according to the invention, as can be seen in FIG. 1 and FIG. 2.

The invention claimed is:
1. A method for the oxidation of hydrogen sulfide, carbonyl sulfide or carbon disulfide to sulfur dioxide, said method comprising the steps of:
   providing a feed gas lean in $H_2S$,
   adding air or $O_2$ to the feed gas,
   heating the feed gas to the desired inlet temperature,
   feeding the gas mixture to an oxidation reactor, which contains an oxidation catalyst, and
   recovering a cleaned gas, wherein syngas is added to the gas mixture prior to feeding the gas mixture to the oxidation reactor, and wherein the feed gas is heated in the absence of a burner.

2. The method according to claim 1, wherein the oxidation catalyst is a sulfur monolith catalyst.

3. The method according to claim 1, wherein the gas mixture is fed to the oxidation reactor via a heat exchanger.

4. The method according to claim 1, wherein the oxidation of $H_2S$ proceeds at an inlet temperature to the catalyst between 200 and 450° C.

5. The method according to claim 4, wherein the inlet temperature to the catalyst is between 200 and 400° C.

6. The method according to claim 4, wherein the inlet temperature to the catalyst is between 250 and 400° C.

7. The method according to claim 1, wherein the inlet temperature to the catalyst is between 250 and 300° C.

8. The method according to claim 1, wherein said oxidation is carried out through catalytic oxidation.

9. The method according to claim 1, wherein said oxidation is not carried out through combustion.

10. A system for carrying out the method according to claim 1 for the oxidation of hydrogen sulfide to sulfur dioxide, said system comprising a gas blower, a heat exchanger and an oxidation reactor, which contains a catalyst, and wherein said system does not comprise a burner.

11. The system according to claim 10, wherein the catalyst is a sulfur monolith catalyst.

12. The system according to claim 10, comprising only one gas blower.

* * * * *